United States Patent
Tsao

(10) Patent No.: US 11,748,110 B2
(45) Date of Patent: Sep. 5, 2023

(54) SERVER WITH SETUP MENU FOR THE BIOS SETTINGS

(71) Applicant: MITAC COMPUTING TECHNOLOGY CORPORATION, Taoyuan (TW)

(72) Inventor: Teng-Yun Tsao, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 281 days.

(21) Appl. No.: 17/239,139

(22) Filed: Apr. 23, 2021

(65) Prior Publication Data
US 2021/0397459 A1    Dec. 23, 2021

(30) Foreign Application Priority Data
Jun. 18, 2020   (TW) ................................. 109120676

(51) Int. Cl.
*G06F 9/44*      (2018.01)
*G06F 9/4401*    (2018.01)
*G06F 11/22*     (2006.01)
*G06F 9/445*     (2018.01)
*G06F 9/451*     (2018.01)

(52) U.S. Cl.
CPC ........ *G06F 9/4406* (2013.01); *G06F 9/44505* (2013.01); *G06F 9/451* (2018.02); *G06F 11/2284* (2013.01)

(58) Field of Classification Search
CPC ..................................... G06F 1/32; G06F 9/44
See application file for complete search history.

(56) References Cited

U.S. PATENT DOCUMENTS

| | | | |
|---|---|---|---|
| 2003/0065915 A1* | 4/2003 | Yu | G06F 11/1417 713/1 |
| 2005/0065905 A1* | 3/2005 | Zhang | G06F 21/78 |
| 2005/0144432 A1* | 6/2005 | Wu | G06F 8/65 713/2 |
| 2009/0125123 A1* | 5/2009 | Lu | G06F 1/1677 700/13 |
| 2009/0158021 A1 | 6/2009 | Joshi et al. | |

* cited by examiner

*Primary Examiner* — Keshab R Pandey
(74) *Attorney, Agent, or Firm* — RABIN & BERDO, P.C.

(57) ABSTRACT

A server is provided. The server includes a Basic Input/Output System (BIOS) memory, a storage device, and a processing unit. The BIOS memory stores a BIOS code, and the BIOS code provides a BIOS setup menu and a saving option in the BIOS setup menu for setting information of a plurality of BIOS setup items. The processing unit is coupled to the BIOS memory and the storage device. The processing unit executes the BIOS code during a power-on self-test (POST) process of the server. When executing the saving option, the processing unit stores the setting information of the plurality of BIOS setup items into the BIOS memory and the storage device, and the processing unit also stores a designated file name into the storage device, the designated file name corresponding to the setting information of the plurality of BIOS setup items that is stored into the storage device.

19 Claims, 3 Drawing Sheets

SERVER WITH SETUP MENU FOR THE BIOS SETTINGS

CROSS-REFERENCE TO RELATED APPLICATION

This non-provisional application claims priority under 35 U.S.C. § 119(a) to Patent Application No. 109120676 filed in Taiwan, R.O.C. on Jun. 18, 2020, the entire contents of which are hereby incorporated by reference.

BACKGROUND

Technical Field

The present disclosure relates to a server, and in particular, to a server having an additional function of storing BIOS setting information into a storage device.

Related Art

With the rapid development of servers, a remote update function is developed nowadays. The remote update function may be executed by a baseboard management controller of the server, and a remote device updates a basic input/output system (BIOS) code or a BIOS configuration of the server, which is quite convenient for maintainers of the server.

However, for updating the BIOS code or the BIOS configuration, the baseboard management controller needs to communicate with a central processing unit. A communication interface between the baseboard management controller and the central processing unit performs communication at a relatively low speed. However, an amount of information of the BIOS code or the BIOS configuration is greater than an amount of to-be-transmitted information of general instructions. Transmission of the information of the BIOS code or the BIOS configuration through the baseboard management controller requires a relatively long communication time. As a result, the BIOS code or the BIOS configuration may be updated quite slowly if the BIOS code or the BIOS configuration is to be updated through the baseboard management controller. In addition, transmitting a large amount of information through the transmission interface with a relatively low transmission speed is likely to cause a data loss. If a part of the data is lost during the communication with the baseboard management controller, more time is required to wait for confirmation of the lost data and wait for the baseboard management controller to retransmit a complete copy of data correlated with the lost data, which instead results in low update efficiency.

SUMMARY

In an embodiment, a server includes a BIOS memory, a storage device, and a processing unit. The BIOS memory stores a BIOS code. The BIOS code provides a BIOS setup menu and a saving option in the BIOS setup menu for setting information of a plurality of BIOS setup items. The processing unit is coupled to the BIOS memory and the storage device. The processing unit executes the BIOS code in a power-on self-test (POST) process of the server. When executing the saving option, the processing unit stores the setting information of the plurality of BIOS setup items into the BIOS memory and the storage device, and the processing unit stores a designated file name into the storage device, where the designated file name corresponds to the setting information of the plurality of BIOS setup items that is stored into the storage device.

DETAILED DESCRIPTION

Figure 1:
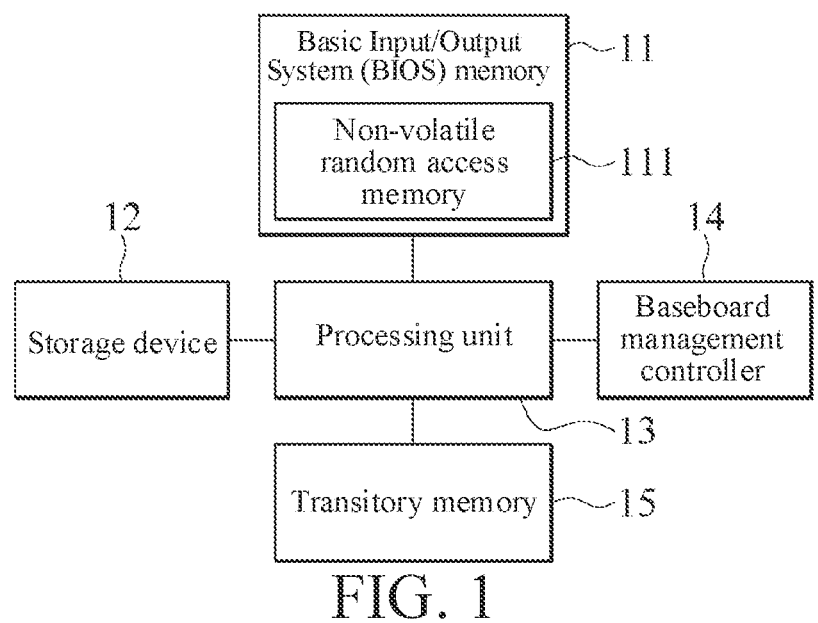
FIG. 1 is a functional block diagram of an embodiment of a server according to the present disclosure.
Figure 2:
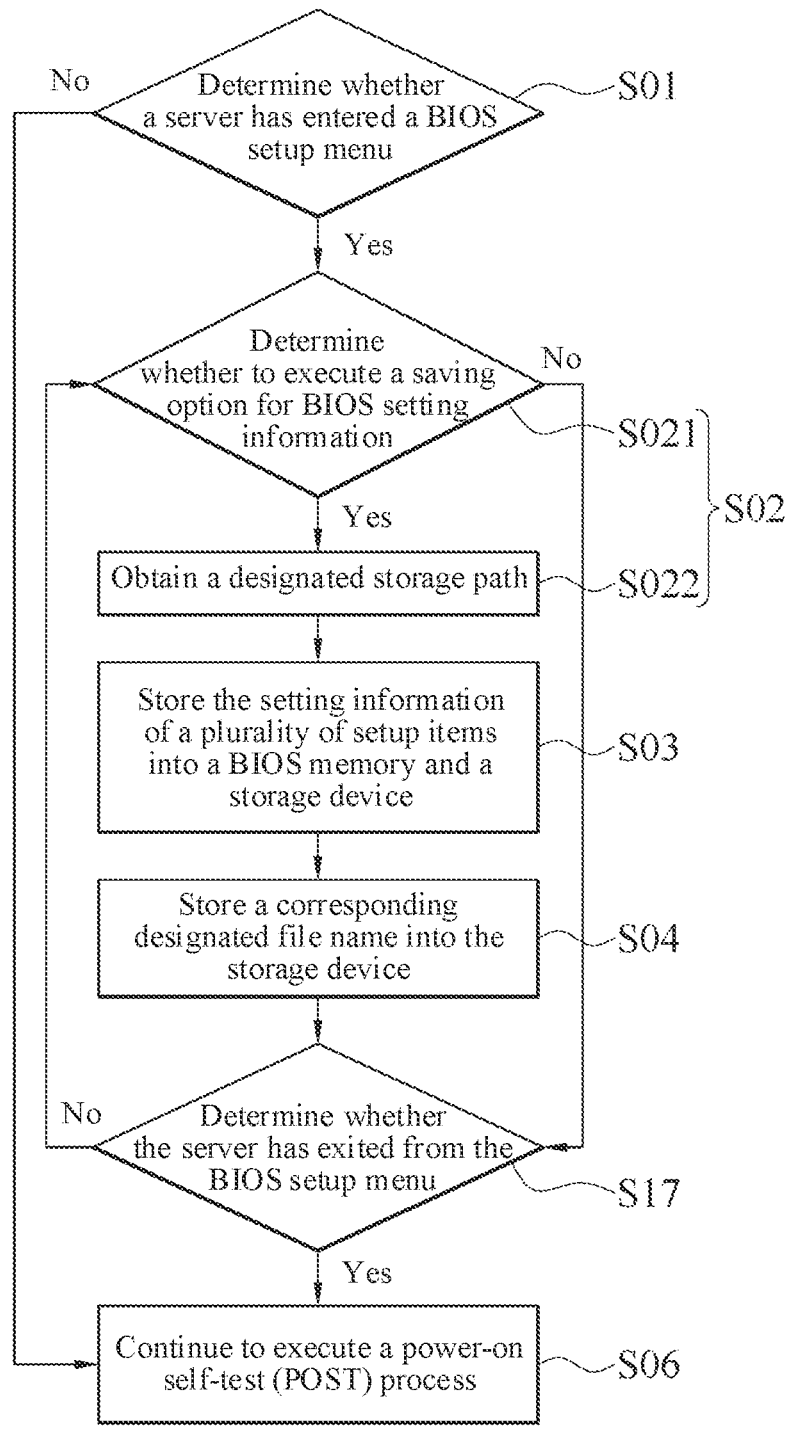
FIG. 2 is a flowchart of an embodiment of a POST process executed by the server in FIG. 1.

FIG. 1 is a functional block diagram of an embodiment of a server according to the present disclosure. FIG. 2 is a flowchart of an embodiment of a POST process executed by the server in FIG. 1. Referring to FIG. 1 and FIG. 2 together, the server includes a BIOS memory 11, a storage device 12, and a processing unit 13. The processing unit 13 is coupled to the BIOS memory 11 and the storage device 12. The BIOS memory 11 stores a BIOS code and BIOS setting information. The processing unit 13 execute the BIOS code by using the BIOS setting information during the POST process of the server, so that the server enters a BIOS setup menu provided by the BIOS code (step S01). The BIOS setup menu provides a plurality of adjustable BIOS setup items. A user of the server may modify the BIOS setting information (setting information) of the server in the BIOS setup menu, that is, modify BIOS parameters corresponding to the BIOS setup items in the BIOS setting information, to change the plurality of BIOS parameters corresponding to the plurality of BIOS setup items in the BIOS setting information from preset values to modified values different from the preset values, or to restore the plurality of BIOS parameters in the BIOS setting information from the modified values to the preset values, or to further change the plurality of BIOS parameters in the BIOS setting information from the modified values to other modified values different from the modified values.

Furthermore, the BIOS setup menu provides a saving option for the BIOS setting information. When the user wants the server to store the BIOS setting information, the user may select the above saving option in the BIOS setup menu so that the processing unit 13 executes the saving option provided in the BIOS setup menu during the POST process (step S02). The processing unit 13 stores the plurality of BIOS parameters in the BIOS setting information of the server into the BIOS memory 11 (step S03), and the processing unit 13 controls the server to be reset, so that the BIOS setting information including the plurality of BIOS parameters that have been changed by the user takes effect. Moreover, in step S03, when the processing unit 13 executes the above saving option during the POST process, the processing unit 13 further stores, into the storage device 12, the BIOS setting information stored into the BIOS memory 11, and stores a corresponding designated file name into the storage device 12 (step S04). The designated file name corresponds to the above BIOS setting information stored into the BIOS memory 11 and the storage device 12, that is, the processing unit 13 establishes a correspondence between the BIOS setup items stored into the storage device 12 and the designated file name in the storage device 12.

Based on this, when the user subsequently wants the server to designate any piece of the BIOS setting information previously stored into the storage device 12, the processing unit 13 may find the corresponding BIOS setting information in the storage device 12 according to a designated file name stored into the storage device 12, so that the server can quickly indiscriminately use BIOS setting information corresponding to the plurality of BIOS parameters that have been previously changed by the user or BIOS setting information pre-stored into the storage device 12. Moreover, the storage device 12 is different from the BIOS memory 11 that stores the BIOS code and the effective BIOS setting information that is executed by the processing unit 13 during the POST process of the server. A BIOS image file that corresponds to a new BIOS code and a new BIOS setting information is commonly used to update the BIOS code in the BIOS memory 11. During updating of the BIOS code, the BIOS memory 11 configured to store the BIOS code may be completely or partly updated, and the effective BIOS setting information originally stored into the BIOS memory 11, which could be a preset setting information or an user-modified setting information, may be erased or destroyed. However, in the present disclosure, the effective BIOS setting information is additionally stored into the storage device 12 different from the BIOS memory 11. Since a BIOS image file that is used to update the BIOS code would be installed in the BIOS memory 11 that stores the BIOS code that is executed by the processing unit 13. A structure of the storage device 12 that is different from the BIOS memory 11 is not easily changed during updating of the BIOS code, which can prevent the correspondence between the BIOS setting information and the designated file name from being destroyed as a result of a structural change of the BIOS memory 11 caused by updating of the BIOS code in the BIOS memory 11, and avoid a failure of indiscriminately using a plurality of sets of BIOS setting information stored by the user.

In an embodiment, the user may set the corresponding BIOS setting information according to different operating modes such as energy consumption, processing performance, or heat dissipation of the server, and set different designated file names corresponding to different operating modes, so that the processing unit 13 stores the corresponding BIOS setting information and designated file name into the storage device 12 according to setting requirements of the user. Processing performance is given by way of example. The user may set BIOS setting information with modified BIOS parameters corresponding to the processing performance in such a way that the server has a high-performance operating mode, and the user may designate corresponding characters as a designated file name, for example, use "high performance" or "performance" as the designated file name of the BIOS setting information corresponding to the processing performance. The processing unit 13 then stores, into the storage device 12 according to the designated file name, the BIOS setting information that meets the requirements of the user. After the processing unit 13 loads the BIOS setting information corresponding to "high performance" or "performance" into a transitory memory used in an operation program of the processing unit 13, the operating mode of the server has high performance. The transitory memory is, for example, a double data rate synchronous dynamic random access memory (DDR SDRAM), a dual in-line memory module (DIMM), a dynamic random access memory (DRAM), or the like. Alternatively, for example, a setting requirement of the user is heat dissipation. The user may set BIOS setting information related to a fan speed in the BIOS setup items, and the user may designate, for example, "heat dissipation" as a designated file name of the BIOS setting information corresponding to heat dissipation. The processing unit 13 then stores the BIOS setting information corresponding to the setting requirements of the user into the storage device 12 according to the designated file name of "heat dissipation". After the processing unit 13 reads the BIOS setting information corresponding to "heat dissipation", the operating mode of the server is to have a relatively high fan speed. In other words, the storage device 12 may simultaneously store a plurality of pieces of BIOS setting information that is changed by the user by executing saving option provided in the BIOS setup menu during power-on for different times and stored into the storage device 12 or a plurality of pieces of BIOS setting information transmitted to the storage device 12 by the user through a network or other transmission tools. In addition, the storage device 12 may further simultaneously store a plurality of pieces of preset BIOS setting information and a plurality of pieces of BIOS setting information stored by the user by executing the saving option during power-on for different times. Based on this, different designated file names may include relatively intuitive characters directly corresponding to a plurality of pieces of BIOS setting information of different requirements of the user. Compared with the designated file name represented in binary bits, required description files corresponding to the BIOS setting information may be reduced. According to the different characters or codes of designated file names, the user may quickly recognize one of the pieces of BIOS setting information corresponding to a to-be-selected operating mode of the server from the plurality of pieces of BIOS setting information stored by the storage device 12 according to the requirements of the user, and may execute the BIOS code by virtue of using the BIOS setting information corresponding to the corresponding to-be-selected operating mode of the server by the processing unit 13, so that the server operates in the corresponding operating mode.

In an embodiment, in step S01, the processing unit 13 may determine whether the server has entered the BIOS setup menu and whether the user selects the above saving option in the BIOS setup menu. If a result of the determination is "No", the processing unit 13 does not perform step S02, and the processing unit 13 may continue to execute the POST process (step S06). Moreover, if the server has entered the BIOS setup menu, the processing unit 13 may determine whether the server has exited from the BIOS setup menu (step S17), and if a result of the determination is "Yes", continues to execute the POST process (step S06). In addition, in step S03, the processing unit 13 may store the BIOS setting information and the designated file name into the corresponding storage device 12 according to a designated storage path designated by the user, and stores the BIOS setting information and the designated file name into a location corresponding to the storage path in the storage device 12. The storage device 12 is controlled by the processing unit 13 for the processing unit 13 to access data. For example, the storage device 12 may be a hard disk in the server or an external storage medium connected to the server, for example, a USB flash drive. The processing unit 13 may first determine whether to execute the saving option for storing the BIOS setting information into the storage device 12 in step S02 (step S021). If a result of the determination is "Yes", the processing unit 13 obtains the designated storage path designated by the user (step S022), for example, a specific folder in the storage device 12 that is the hard disk, and then the processing unit 13 stores the BIOS setting information and the designated file name to the specific folder in the hard disk according to the designated storage path in step S03.

In an embodiment, in step S03, the processing unit 13 may compress and encrypt the BIOS setting information, and then stores the BIOS setting information into the storage device 12. Furthermore, in step S03, the processing unit 13 may store all of the adjustable BIOS setting information into the storage device 12. Alternatively, in order to reduce an execution time for the processing unit 13 to store all BIOS parameters of all of the adjustable BIOS setting information into the storage device 12, preset values corresponding to the BIOS parameters of the BIOS setting information may be pre-stored into the BIOS memory 11 and/or the storage device 12 before the processing unit 13 executes the POST process. For example, before step S03 is performed, the processing unit 13 may check if the BIOS setting information with preset values do exist in the storage device 12. In an embodiment, the processing unit 13 checks if the assigned filename by the user is corresponding to the pre-defined filename of the BIOS setting information saved in the storage device 12. When step S03 is performed during a previous power-on, the processing unit 13 may store the BIOS setting information including BIOS parameters corresponding to the preset value into the storage device 12 by using a corresponding designated file name of "preset" if no preset values exist in the storage device 12, and then resets or restarts the server. In an embodiment, the server keeps the preset values of the BIOS setup items in the storage device 12 before they are overwritten by the modified values in the BIOS memory 11. So that, the server keeps the preset values and the modified values of the BIOS setup items in the same storage device 12 by assigning different file name. In any subsequent power-on process, if the user wants to execute the saving option in order to store current BIOS setting information of the server, the processing unit 13 may only store modified BIOS parameters in the BIOS setting information and related information of the BIOS setting information corresponding to the modified BIOS parameters into the storage device 12 when performing step S03. In other words, in step S03, the processing unit 13 may not need to repeatedly store, into the storage device 12, the BIOS parameters corresponding to the preset values in the BIOS setting information and the related information corresponding to unmodified BIOS parameters in the BIOS setting information. In more detail, when performing step S03, the processing unit 13 further determine a difference between current BIOS parameters corresponding to the BIOS setup items in the current BIOS setting information and the preset values through comparison, to determine whether the BIOS parameters corresponding to the BIOS setup items are consistent with related preset values, so as to obtain BIOS parameters with modified values different from the preset values, and store, into the storage device 12, only BIOS setting information having only the BIOS parameters corresponding to the modified values.

Figure 3:
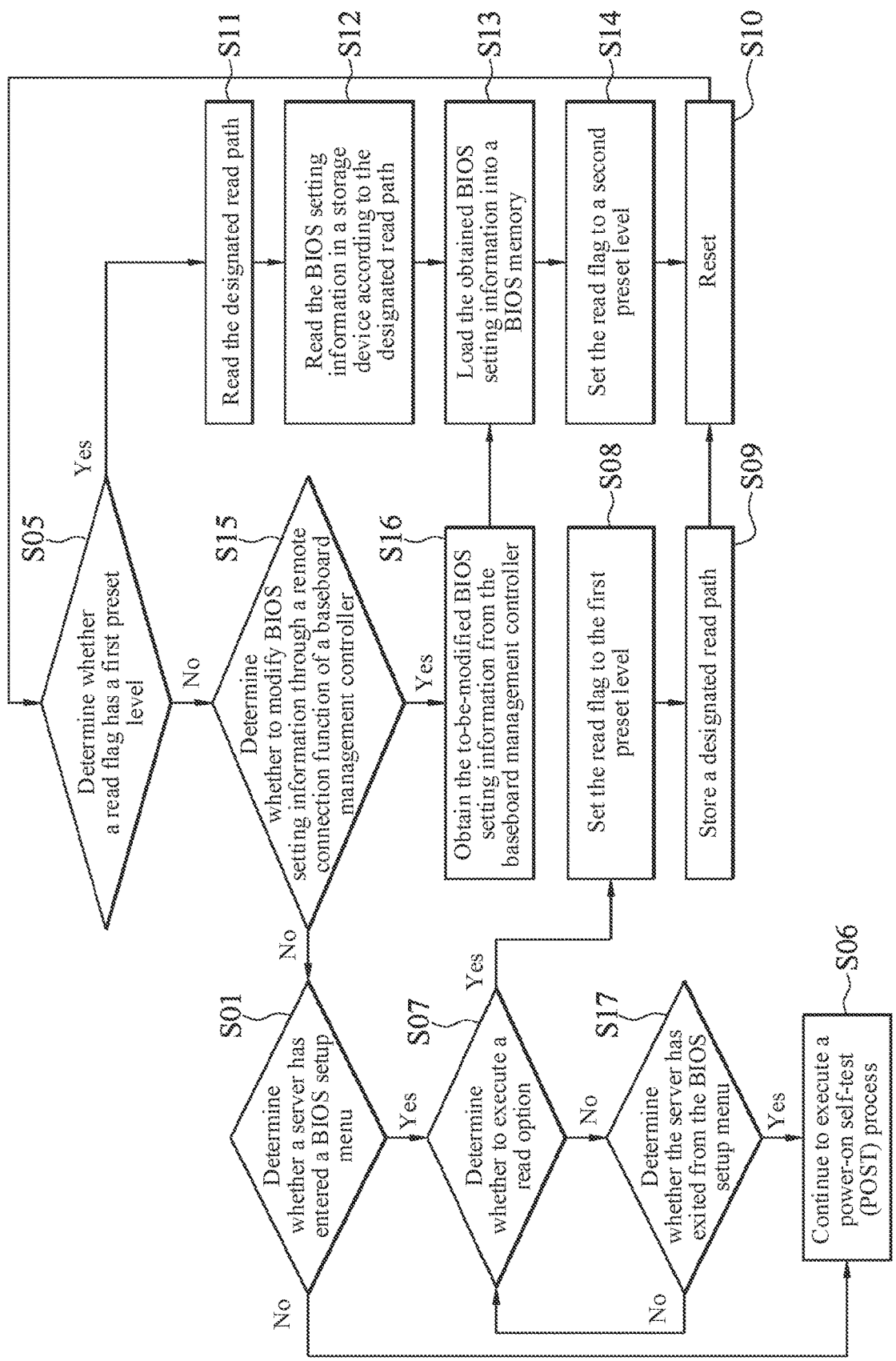
FIG. 3 is a flowchart of another embodiment of the POST process executed by the server in FIG. 1.

In an embodiment, the BIOS setup menu further provides a read option for the BIOS setting information. The user may select the above read option directly from the BIOS setup menu so that the server indiscriminately uses any BIOS setting information stored into the storage device 12 according to the designated file name. Referring to FIG. 1 and FIG. 3 together, before the processing unit 13 executes the BIOS setup menu during the POST process (step S01), the processing unit 13 first determines whether a logical value of a read flag corresponding to the read option has a first preset value (step S05). For example, the first preset value may be 1. When the processing unit 13 executes step S05, the POST process has not been executed to a stage of allowing the server to enter the BIOS setup menu, and the user cannot select the read option in the BIOS setup menu. Therefore, the processing unit 13 determines that the read flag does not have the first preset value (if the result of the determination is "No") when performing step S05. Next, the processing unit 13 executes the POST process to the stage of allowing the server to enter and execute the BIOS setup menu, and allows the user to select the read option or the saving option when executing the BIOS setup menu (step S01). The processing unit 13 determines whether the user selects the read option (step S07). When the user selects the read option (if a result of the determination is "Yes") and designates a designated read path corresponding to the designated file name, the processing unit 13 executes the read option to automatically set a read flag corresponding to the read option (step S08) so that the read flag has the above first preset value. Furthermore, the processing unit 13 stores the designated read path into the BIOS memory 11 (step S09). After the storage of the designated read path is completed, the processing unit 13 automatically controls the server to be reset or restarted (step S10). The plurality of pieces of BIOS setting information stored into the storage device 12 correspond to different read paths to respectively indicate different storage locations or different folders in the storage device 12. In step S08, the user may also designate a designated file name corresponding to a designated read path when selecting the read option. When executing the read option, the processing unit 13 automatically obtains the designated read path corresponding to the designated file name selected by the user, so as to automatically set the read flag corresponding to the read option.

During a POST procedure (hereinafter referred to as a second POST procedure) after the server is restarted, the processing unit 13 performs step S05. According to step S08 performed by the processing unit 13 in the first POST procedure, the processing unit 13 determines that the read flag has the first preset value (if a result of the determination is "Yes") in step S05 of the second POST procedure. The processing unit 13 reads the designated read path stored into the BIOS memory 11 in the first POST procedure according to the result of the determination of "Yes" in step S05 (step S11), and the processing unit 13 reads the corresponding BIOS setting information from a storage location in the storage device 12 corresponding to the designated reading path (step S12). The processing unit 13 may decompress and decrypt the BIOS setting information, and then the processing unit 13 loads, into the BIOS memory 11, the BIOS setting information read from the storage device 12 (step S13), so that the BIOS setting information read from the storage device 12 is rewritten to the BIOS memory 11, thereby integrating the BIOS setting information read from the storage device 12 with the BIOS setting information of the BIOS memory 11 and storing the information into the BIOS memory 11 by overlaying at least a corresponding BIOS parameter of the BIOS setting information that has existed in the BIOS memory 11 and related information in the first POST procedure. After the processing unit 13 performs step S13, the processing unit 13 automatically sets the above read flag so that the read flag has a second preset value instead of the first preset value (step S14). For example, the second preset value may be 0. The processing unit 13 automatically controls the server to be restarted again after the flag is set to the second preset value (step S10), so that the BIOS setting information loaded into the BIOS memory 11 in step S13 takes effect.

In a POST procedure (hereinafter referred to as a third POST procedure) after the server is restarted, the processing unit 13 may be preset to read the BIOS memory 11 before performing step S01 or step S05, to read the BIOS setting information integrated into the BIOS memory 11 in step S13 of the second POST procedure. The processing unit 13 sets the server according to the BIOS setting information obtained by reading BIOS memory 11 in the third POST procedure, so that each piece of BIOS setting information takes effect. The above designated file name of "high performance" or "performance" is given by way of example. When the BIOS setting information corresponding to "high performance" or "performance" takes effect, the operating mode of the server has high performance. Alternatively, the above designated file name of "heat dissipation" is given by way of example. When the BIOS setting information corresponding to the fan speed takes effect, the operating mode of the server is to have a relatively high fan speed.

Furthermore, during the above third POST procedure, according to the read flag set by the processing unit 13 in step S14 during the second POST procedure, when the processing unit 13 determines that the logical value of the read flag is the second preset value instead of the first preset value (if the result of the determination is "No") when performing step S05 during the third POST procedure, the processing unit 13 does not perform step S11. In this case, the processing unit 13 may communicate with a baseboard management controller 14. The processing unit 13 determines whether the user has modified the BIOS setting information through a remote connection function of the baseboard management controller 14 (step S15). If the processing unit 13 determines that the user has not modified the BIOS setting information through the above remote connection function (if the result of the determination is "No"), the processing unit 13 further determines whether the server has entered the BIOS setup menu (step S01). Subsequent steps are described in detail above and are not repeated herein again.

In an embodiment, in step S15, if the processing unit 13 determines that the user is to modify the BIOS setting information through the remote connection function (if the result of the determination is "Yes"), the processing unit 13 may obtain a BIOS setting parameter corresponding to at least one to-be-changed BIOS setup item of BIOS setting information through the baseboard management controller 14 (step S16), and store, into the BIOS memory 11, the BIOS setting information obtained from the baseboard management controller 14 and including the BIOS setting parameter corresponding to the at least one to-be-changed BIOS setup item (step S13). In other words, the server also has the remote update function of the baseboard management controller 14 to update the BIOS code of the server from a remote device.

In an embodiment, as shown in FIG. 1, the server further includes a transitory memory 15 coupled to the processing unit 13. When the processing unit 13 executes the BIOS setup menu, if the user modifies the BIOS setting information in the BIOS setup menu and the user does not select the saving option, the processing unit 13 may temporarily store a modified value corresponding to the BIOS parameter of the BIOS setting information into the transitory memory 15. When the user selects the saving option to cause the processing unit 13 to execute the saving option, the processing unit 13 stores the modified value corresponding to the BIOS parameter of the BIOS setting information from the transitory memory 15 into the BIOS memory 11. Furthermore, in step S12, the processing unit 13 first reads the designated BIOS setting information to the transitory memory 15 from the designated storage device 12 according to the designated read path, and then stores the BIOS setting information to the BIOS memory 11 from the transitory memory 15.

In an embodiment, the BIOS memory 11 includes a non-volatile random access memory 111, and the designated read path and read flag may be stored into the non-volatile random access memory 111. In an embodiment, the processing unit 13 may be a central processing unit (CPU), a combined circuit of the CPU and a platform controller hub (PCH), or a system on a chip (SoC) having the CPU and the PCH.

Based on the above, according to an embodiment of the server in the present disclosure, the user can quickly load the BIOS setting information into the server through the storage device, and can selectively load any BIOS setting information from the storage device storing a plurality of groups of BIOS setting information merely by operating the BIOS setup menu of the server without updating the BIOS setting information through the baseboard management controller, which can save a lot of time for waiting for the execution of the baseboard management controller. Furthermore, storing the BIOS setting information into the storage device can avoid a failure to indiscriminately use the BIOS setting information stored by the user as a result of destruction of the correspondence between the BIOS setting information and the designated file name caused by updating of the BIOS code. Moreover, the BIOS setting information is compressed and encrypted, so that a storage time of the storage device can be reduced, and correctness and security of the BIOS setting information can be ensured.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:
1. A server, comprising:
a Basic Input/Output System (BIOS) memory configured to store a BIOS code, wherein the BIOS code provides a BIOS setup menu and a saving option in the BIOS setup menu for setting information of a plurality of BIOS setup items;
a storage device; and
a processing unit coupled to the BIOS memory and the storage device and configured to execute the BIOS code during a power-on self-test (POST) process of the server,
wherein when executing the saving option, the processing unit stores the setting information of the BIOS setup items into the BIOS memory and the storage device, and the processing unit also stores a designated file name into the storage device, wherein the designated file name corresponds to the setting information of the BIOS setup items that is stored into the storage device; and
wherein the BIOS code further provides a read option in the BIOS setup menu that corresponds to the designated file name, and when executing the read option during the POST process, the processing unit reads, according to the designated file name, the setting information of the BIOS setup items that is stored into the storage device, and loads the setting information of the

BIOS setup items that is read from the storage device into the BIOS memory to cause the setting information to take effect.

2. The server according to claim 1, wherein the storage device is a hard disk or an external storage medium meeting a Universal Serial Bus (USB) specification.

3. The server according to claim 1, wherein the processing unit stores the setting information of all of the adjustable BIOS setup items into the BIOS memory and the storage device.

4. The server according to claim 1, wherein the setting information of the BIOS setup items has a preset value and a modified value different from the preset value, and the processing unit compares the modified value with the preset value to store the modified value of the setting information of the BIOS setup items into the storage device.

5. The server according to claim 1, wherein: when executing the read option in the BIOS setup menu during a first POST procedure of the POST process, the processing unit further stores a designated read path corresponding to the designated file name into the BIOS memory during the first POST procedure; after storing the designated read path into the BIOS memory, the processing unit controls the server to be reset; and during a second POST procedure after the server is reset, the processing unit reads the setting information of the BIOS setup items from the storage device according to the designated read path and loads, into the BIOS memory, the setting information of the BIOS setup items that is read from the storage device.

6. The server according to claim 5, wherein: after loading the setting information of the BIOS setup items into the BIOS memory during the second POST procedure, the processing unit controls the server to be reset; and during a third POST procedure after the server is reset and before executing the BIOS setup menu, the processing unit reads the setting information of the BIOS setup items in the BIOS memory to initialize the server.

7. The server according to claim 5, wherein during each of the POST procedures and when executing the BIOS setup items, the processing unit further determines whether a read flag corresponding to the read option has a first preset value, wherein during the first POST procedure and when storing the designated read path, the processing unit further sets the read flag to the first preset value to read the setting information of the BIOS setup items from the storage device according to the designated read path in response to determining that the read flag has the first preset value during the second POST procedure.

8. The server according to claim 7, wherein after loading the setting information of the BIOS setup items into the BIOS memory during the second POST procedure, the processing unit sets the read flag to a second preset value.

9. The server according to claim 1, wherein the designated file name comprises characters corresponding to an operating mode of the server.

10. The server according to claim 1, wherein the processing unit determines whether the server has entered the BIOS setup menu, and if a result of the determination is that the server has entered the BIOS setup menu, the processing unit executes the BIOS code.

11. The server according to claim 10, wherein if the result of the determination is that the server has not entered the BIOS setup menu, the processing unit continues to execute the POST process.

12. The server according to claim 1, wherein after storing the designated file name into the storage device, the processing unit determines whether the server has exited from the BIOS setup menu, and if a result of the determination is that the server has exited from the BIOS setup menu, the processing unit continues to execute the POST process.

13. The server according to claim 12, wherein if the result of the determination is that the server has not exited from the BIOS setup menu, the processing unit continues to execute the BIOS code.

14. The server according to claim 1, wherein the processing unit compresses and encrypts the setting information of the BIOS setup items and stores the compressed and encrypted setting information of the BIOS setup items into the storage device.

15. The server according to claim 7, wherein when determining that the read flag does not have the first preset value, the processing unit determines whether a baseboard management controller is connected to the processing unit through a remote function to modify the setting information of the BIOS setup items, and if a result of the determination is that the baseboard management controller is connected to the processing unit through the remote function, the processing unit obtains setting information corresponding to the to-be-modified setting information of the BIOS setup items from the baseboard management controller.

16. The server according to claim 15, wherein if the result of the determination is that the baseboard management controller is not connected to the processing unit through the remote function, the processing unit determines whether the server has entered the BIOS setup menu.

17. The server according to claim 1, further comprising a transitory memory coupled to the processing unit, wherein the processing unit temporarily stores the setting information of the BIOS setup items into the transitory memory, and when executing the saving option, the processing unit stores the setting information of the BIOS setup items from the transitory memory into the BIOS memory.

18. The server according to claim 5, wherein the processing unit reads the setting information of the BIOS setup items from the storage device according to the designated read path and stores the setting information into a transitory memory, and then reads the setting information of the BIOS setup items from the transitory memory and stores the setting information into the BIOS memory.

19. The server according to claim 7, wherein the BIOS memory comprises a non-volatile random access memory, wherein the designated read path and the read flag are stored into the non-volatile random access memory.

* * * * *